United States Patent
Mizoguchi (10) Patent No.: US 9,643,499 B2
(45) Date of Patent: May 9, 2017

(54) ELECTRIC POWER SYSTEM

(71) Applicant: TOYOTA JIDOSHA KABUSHIKI KAISHA, Toyota-shi, Aichi-ken (JP)

(72) Inventor: Hayato Mizoguchi, Kariya (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 307 days.

(21) Appl. No.: 14/325,621

(22) Filed: Jul. 8, 2014

(65) Prior Publication Data

US 2015/0008735 A1 Jan. 8, 2015

(30) Foreign Application Priority Data

Jul. 8, 2013 (JP) .................................. 2013-142597

(51) Int. Cl.
*H02J 4/00* (2006.01)
*B60L 11/18* (2006.01)
(Continued)

(52) U.S. Cl.
CPC ............. *B60L 11/1803* (2013.01); *B60L 7/10* (2013.01); *B60L 7/14* (2013.01); *B60L 7/16* (2013.01); *B60L 8/003* (2013.01); *B60L 15/2045* (2013.01); *H02J 7/0054* (2013.01); *H02J 7/0055* (2013.01); *H02J 7/1415* (2013.01);
(Continued)

(58) Field of Classification Search
CPC .... Y10T 307/707; Y10T 307/273; H02J 1/02; H02J 7/0054; H02M 2003/1586; B60L 11/1803
See application file for complete search history.

(56) References Cited

U.S. PATENT DOCUMENTS

2010/0001583 A1* 1/2010 Ichikawa .............. B60L 3/0046
307/10.1
2012/0081071 A1 4/2012 Asakura et al.

FOREIGN PATENT DOCUMENTS

JP 5-64441 3/1993
JP 2004-187468 7/2004
(Continued)

OTHER PUBLICATIONS

S. Waffler et al., Output Ripple Reduction of an automotive Multi-Phase Bi-Directional DC-DC Converter, Sep. 20, 2009, IEEE, 2009 IEEE Energy Conversion Congress and Exposition, p. 2184-2190.*
(Continued)

*Primary Examiner* — Jared Fureman
*Assistant Examiner* — Fan He
(74) *Attorney, Agent, or Firm* — Nixon & Vanderhye P.C.

(57) ABSTRACT

An electric power system includes a plurality of combinations of one of electric loads, which transmit/receive electric power, and one of power converters which is connected to the one of the electric loads and performs power conversion operation according to a predetermined switching synchronization signal so that electric power is transmitted/received to/from the electric load, the combinations being connected to a predetermined intermediate point so as to be parallel to each other, and a power conversion control unit which controls operations of the power converters. The power conversion control unit variably sets switching phases of the power converters depending on operating conditions of the power converters.

6 Claims, 6 Drawing Sheets

(51) Int. Cl.
*B60L 7/10* (2006.01)
*B60L 7/14* (2006.01)
*B60L 7/16* (2006.01)
*B60L 8/00* (2006.01)
*B60L 15/20* (2006.01)
*H02J 7/00* (2006.01)
*H02J 7/14* (2006.01)
*H02J 7/35* (2006.01)

(52) U.S. Cl.
CPC .......... *H02J 7/1423* (2013.01); *H02J 7/1438* (2013.01); *H02J 7/1492* (2013.01); *H02J 7/35* (2013.01); *H02J 2007/0059* (2013.01); *H02J 2007/143* (2013.01); *Y02T 10/645* (2013.01); *Y02T 10/7005* (2013.01); *Y02T 10/7083* (2013.01); *Y02T 10/7283* (2013.01); *Y10T 307/352* (2015.04)

(56) References Cited

FOREIGN PATENT DOCUMENTS

| | | | | |
|---|---|---|---|---|
| JP | 2004187468 | A | * | 7/2004 |
| JP | 2006-054992 | | | 2/2006 |
| JP | 2006054992 | A | * | 2/2006 |
| JP | 2010-233292 | | | 10/2010 |
| JP | 2012-080683 | | | 4/2012 |
| JP | 2012080683 | A | * | 4/2012 |

OTHER PUBLICATIONS

Office Action (3 pages) dated May 26, 2015, issued in corresponding Japanese Application No. 2013-142597 and English translation (3 pages).

\* cited by examiner

ELECTRIC POWER SYSTEM

CROSS-REFERENCE TO RELATED APPLICATION

This application is based on and claims the benefit of priority from earlier Japanese Patent Application No. 2013-142597 filed Jul. 8, 2013, the description of which is incorporated herein by reference.

BACKGROUND (Technical Field)

The present invention relates to an electric power system that includes a plurality of (three or more in particular) power converters.

(Related Art)

A known system of this type is disclosed, for example, in patent document JP-A-2010-233292. The system disclosed in this patent document includes a plurality of (N number of) power converters which are operated with the switching frequencies being synchronized and with an appropriate phase difference being given. In the system, a phase angle of approximately $2\pi/(N \cdot n)$ is ensured to be set, where n is a minimum order of harmonic components of the switching frequencies that are approximate to a lower limit frequency in a noise standard with which the system should be compliant.

In such systems based on conventional art including the one mentioned above, the correlation between switching phases are fixedly set on the basis of solely a value similar to a constant, such as the number of converters, which does not rely on the system's operating conditions. Therefore, the systems of this type based on the conventional art are not yet sufficient at all from the viewpoint of suppressing ripple current and the noise accompanying the ripple current when there is a change in the operating conditions (i.e. in the input/output electric powers of the individual power converters).

SUMMARY

As an aspect of the embodiment, an electric power system is provided which includes: a plurality of combinations of one of electric loads, which transmit/receive electric power, and one of power converters which is connected to the one of the electric loads and performs power conversion operation according to a predetermined switching synchronization signal so that electric power is transmitted/received to/from the electric load, the combinations being connected to a predetermined intermediate point so as to be parallel to each other; and a power conversion control unit which controls operations of the power converters. The power conversion control unit variably sets switching phases of the power converters depending on operating conditions of the power converters.

DETAILED DESCRIPTION OF THE PREFERRED EMBODIMENTS

With reference to the accompanying drawings, hereinafter is described an embodiment of the present invention. Modifications of the present invention are collectively explained in the end because mixing up modifications in the explanation of the embodiment will prevent coherent understanding of the embodiment.

<Configuration>

Figure 1:
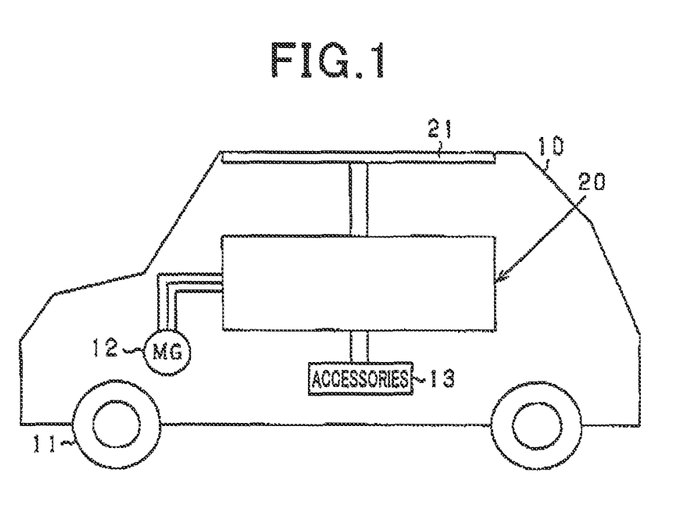
FIG. 1 is a schematic diagram illustrating an electric vehicle (vehicle power system) as an example of an application of the present invention.

FIG. 1 is a schematic diagram illustrating an electric vehicle 10 (vehicle power system). The electric vehicle 10 shown in FIG. 1 is configured to run when drive wheels 11 are rotated and driven by a motor-generator 12. The motor-generator 12 as a drive motor is a three-phase AC rotary electric machine and is connected to the drive wheels 11 via a motive power transmission mechanism, not shown. In other words, the electric vehicle 10 is configured to be driven by the motor-generator 12 as a drive motor. Further, the motor-generator 12 is also configured to operate as an electric generator having a regenerative braking function that suppresses the rotation of the drive wheels 11 when the electric vehicle 10 is decelerated. The electric vehicle 10 is installed with accessories 13 that are activated when power is fed thereto.

The electric vehicle 10 is installed with a vehicle power system 20 that is an embodiment of the present invention. The vehicle power system 20 is configured to make use of power generated in a solar panel 21 (the electric power generated across the output terminals of the solar panel 21). Specifically, the vehicle power system 20 is configured to accumulate electric power and consume the electric power in various parts. The solar panel 21 as an electric load, a solar power generation apparatus or a first load is mounted on the roof of the electric vehicle 10 in the present embodiment.

Figure 2:
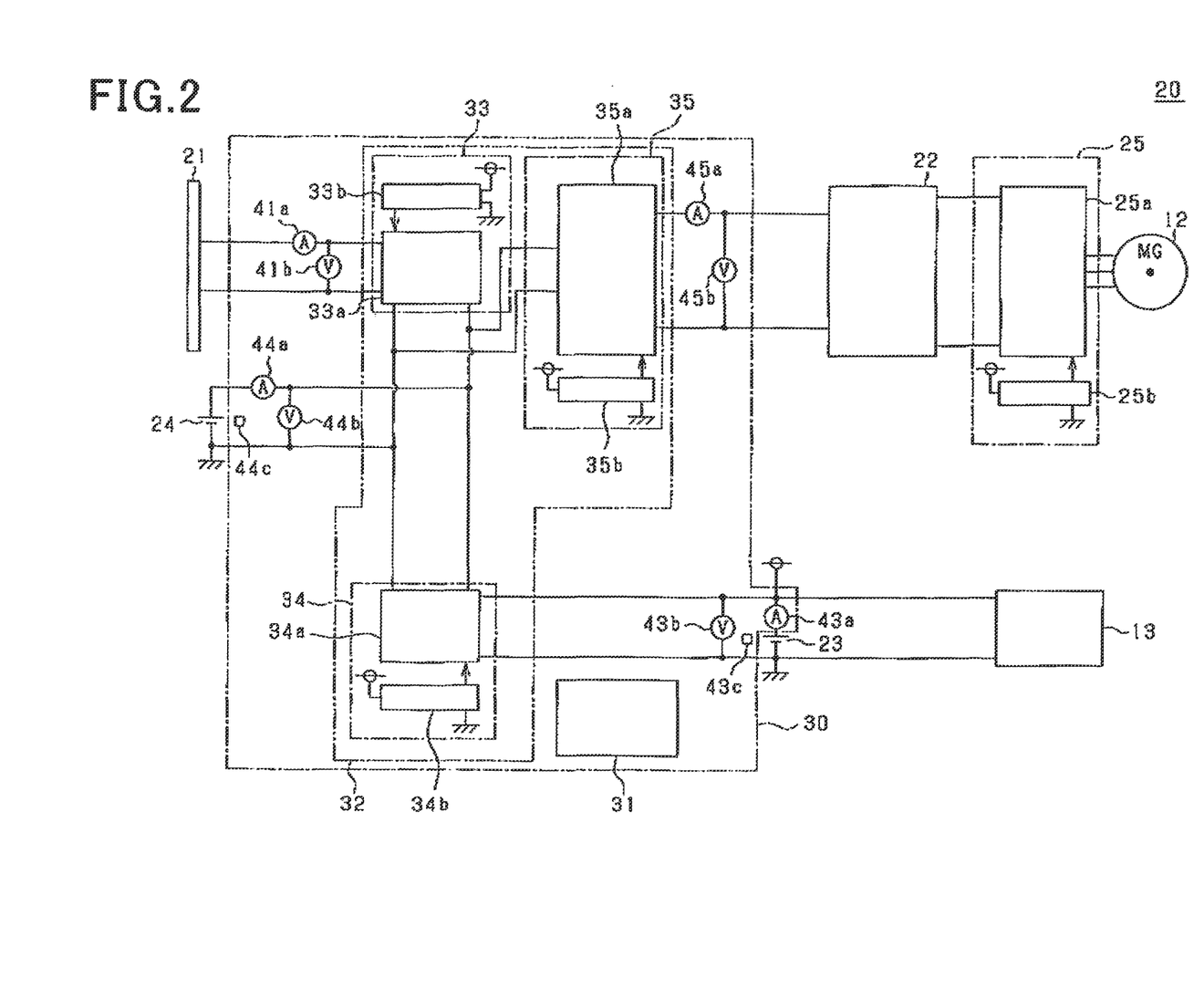
FIG. 2 is a schematic block diagram illustrating a circuit configuration of the vehicle power system shown in FIGS. 1.

FIG. 2 is a schematic block diagram illustrating a circuit configuration of the vehicle power system 20. As shown in FIG. 2, the vehicle power system 20 includes, as storage batteries, a main battery 22, an accessory battery 23 and a sub battery 24. The main battery 22 as the electric load or a second load is ensured to supply a source power to the motor-generator 12 and also to store regenerative power that is generated by the motor-generator 12, as mentioned above, when the electric vehicle is decelerated. In the present embodiment, a plurality of battery cells, such as nickel hydride batteries, are connected in series and in parallel with each other in the main battery 22 to ensure output of high voltage (of about 300 V in the present embodiment).

The accessory battery 23 as the electric load or a third load is a lead battery (of about 12 V in the present embodiment) which is ensured to supply source power required for activating the accessories 13 or the like (including drive controllers that will be described later).

The sub battery 24 as the electric load or a fourth load is ensured to supply electric power for charging the main battery 22 and the accessory battery 23 when a residual amount of charge is insufficient in these batteries. In the present embodiment, the sub battery 24 is configured so that a plurality of storage cells, such as nickel hydride batteries, are connected in series and in parallel with each other to output a predetermined high voltage (of about 30 V in the present embodiment) which is lower than the voltage of the main battery 22 but higher than that of the accessory battery 23.

Other than the batteries mentioned above, the vehicle power system 20 includes a power control unit 25 (including an inverter 25a and a drive controller 25b) and a solar ECU 30.

The main battery 22 is connected to the motor-generator 12 via the power control unit 25. As mentioned above, the power control unit 25 includes the inverter 25a and the drive controller 25b (driver circuit) that controls the operation of the inverter 25a. The power control unit 25 is ensured to control electric power transmission/reception between the motor-generator 12 and the main battery 22 depending on the operating conditions of the vehicle power system 20 (i.e. the electric vehicle 10 shown in FIG. 1).

The solar ECU 30 is configured to control electric power transmission/reception of various parts of the vehicle control system 20 depending on the operating conditions of the electric vehicle 10 (see FIG. 1). The operating conditions include the conditions of generating power in the solar panel 21, residual amounts of charge in the main battery 22, the accessory battery 23 and the sub battery 24, or the like. The following description more specifically explains the solar ECU 30 of the present embodiment.

The solar ECU 30 includes a microcomputer 31 and a power conversion unit 32. The microcomputer 31 is ensured to control the operation of the power conversion unit 32 depending on the operating conditions of the vehicle power system 20.

The power conversion unit 32 establishes connection with the solar panel 21, the main battery 22, the accessory battery 23 and the sub battery 24. The power conversion unit 32 converts electric power generated in the solar panel 21 to a primary conversion power. In the present embodiment, the power conversion unit 32 temporarily allows the sub battery 24 to store the primary conversion power and at the same time charges the primary conversion power, or the power outputted from the sub battery 24, to the main battery 22 and the accessory battery 23.

Specifically, the power conversion unit 32 includes a solar generation converter 33 (including a DC/DC converter 33a and a drive controller 33b), an accessory-side converter 34 (including a DC/DC converter 34a and a drive controller 34b) and a main battery-side converter 35 (including a DC/DC converter 35a and a drive controller 35b).

The solar generator converter 33 as a power converter or a first power converter is ensured to transmit/receive electric power to/from the solar panel 21. In the present embodiment, the solar generation converter 33 variably inputs/outputs, i.e. converts, electric power and unidirectionally performs conversion. The solar generation converter 33 has a power input-side terminal which is connected to the solar panel 21.

Specifically, the solar generation converter 33 is ensured to convert the electric power generated in the solar panel 21 to the primary conversion power mentioned above and to output the primary conversion power. More specifically, the solar generation converter 33 sets an operating point of the solar panel 21 using MPPT (maximum power point tracking) control. At the same time, the solar generation converter 33 is ensured to convert a generated electric power having current and voltage corresponding to the operating point to an electric power having a predetermined voltage (of about 30 V) and output the converted power. As mentioned above, the solar generation converter 33 includes the DC/DC converter 33a and the driver controller 33b (driver circuit) that controls the operation of the DC/DC converter 33a.

The power output-side terminal of the solar generation converter 33 establishes parallel connection with the sub battery 24, the accessory-side converter 34 and the main battery-side converter 35. In other words, the solar generation converter 33 is ensured to provide its output that is the primary conversion power mentioned above to the sub battery 24, the accessory-side converter 34 and the main battery-side converter 35. Inside the power conversion unit 32, a power line is provided between the power output-side terminal of the solar generation converter 33 and a power input-side terminal of the accessory-side converter 34. The sub battery 24 is connected to the power line so that the primary conversion power is charged to the sub battery 24. In other words, the sub battery 24 is connected to the solar generation converter 33 so as to be parallel to the accessory-side converter 34.

The accessory-side converter 34 as the power converter or a third power converter is ensured to transmit/receive electric power to/from the accessory battery 23. Specifically, the accessory-side converter 34 variably inputs/outputs, i.e. converts, electric power and unidirectionally performs conversion. The accessory-side converter 34 has a power output-side terminal to which the accessories 13 and the accessory battery 23 are parallelly connected. On the other hand, the accessory-side converter 34 has a power input-side terminal to which the solar generation converter 33 and the sub battery 24 are parallelly connected.

As mentioned above, the accessory-side converter 34 includes the DC/DC converter 34a and the drive controller 34b (driver circuit) that controls the operation of the DC/DC converter 34a. The accessory-side converter 34 is ensured to convert (specifically, step down) the primary conversion power that is an output from the solar generation converter 33, or the power outputted from the sub battery 24, to a low-voltage (about 12 V) power. The converted low-voltage power is ensured to be outputted to the accessory battery 23 to charge the accessory battery 23.

The main battery-side converter 35 as the power converter or a second power converter is ensured to transmit/receive electric power to/from the main battery 22. Specifically, the main battery 22 is connected to the power output-side terminal of the main battery-side converter 35 so as to be charged by the output of the main battery-side converter 35.

The main battery-side converter 35 inputs/outputs, i.e. converts, electric power of a fixed level and unidirectionally performs conversion. The main battery-side converter 35 has a power input-side terminal which is connected to a power line branched from the power line between the power output-side terminal of the solar generation converter 33 and the power input-side terminal of the accessory-side converter 34. In other words, the accessory-side converter 34 and the main battery-side converter 35 are connected parallel to the sub battery 24. Further, the power input-side terminal of the main battery-side converter 35 establishes parallel connection with the solar generation converter 33 and the sub battery 24.

As mentioned above, the main battery-side converter 35 includes the DC/DC converter 35a and the drive controller 35b (driver circuit) that controls the operation of the DC/DC converter 35a. The main battery-side converter 35 is ensured to convert (specifically, step up) the output of the solar generation converter 33 or the sub battery 24 to a high voltage (of about 300 V) power. The converted high voltage power is ensured to be outputted to the main battery 22 to charge the main battery 22.

A solar current sensor 41a and a solar voltage sensor 41b are arranged between the solar panel 21 and the power conversion unit 32 (the power input-side terminal of the solar generation converter 33). The solar current sensor 41a is ensured to produce an output indicative of the current in the electric power generated in the solar panel 21. The solar voltage sensor 41b is ensured to produce an output indicative of the voltage in the electric power generated in the solar panel 21.

The power conversion unit 32 has a connecting portion therein connected to the accessory battery 23. The connecting portion is provided with an accessory battery current sensor 43a, an accessory battery voltage sensor 43b and an accessory battery temperature sensor 43c. The accessory battery current sensor 43a is ensured to produce an output indicative of the terminal current of the accessory battery 23. The accessory battery voltage sensor 43b is ensured to produce an output indicative, of the voltage across the terminals of the accessory battery 23. The accessory battery temperature sensor 43c is ensured to produce an output indicative of the temperature of the accessory battery 23.

Similarly, the power conversion unit 32 has a connecting portion connected to the sub battery 24. The connecting portion is provided with a sub battery current sensor 44a, a sub battery voltage sensor 44b and a sub battery temperature sensor 44c. The sub battery current sensor 44a is ensured to produce an output indicative of the terminal current of the sub battery 24. The sub battery voltage sensor 44b is ensured to produce an output indicative of the voltage across the terminals of the sub battery 24. The sub battery temperature sensor 44c is ensured to produce an output indicative of the temperature of the sub battery 24.

Further, the power conversion unit 32 has a connecting portion connected to the main battery 22. The connecting portion is provided with a main battery charge-current sensor 45a and a main battery voltage sensor 45b. The main battery charge-current sensor 45a is ensured to produce an output indicative of the output current of the main battery-side converter 35. The main battery voltage sensor 45b is ensured to produce an output indicative of the output voltage of the main battery-side converter 35 (i.e. the voltage across the terminals of the main battery 22).

The microcomputer 31 as a power conversion control unit is configured to control the operations of the solar generation converter 33, the accessory-side converter 34 and the main battery-side converter 35, on the basis of the outputs from the various sensors mentioned above. In other words, the microcomputer 31 is ensured to input an on/off control signal and a switching synchronization signal having a predetermined frequency to the drive controllers mentioned above.

In the present embodiment, the solar generation converter the accessory-side converter 34 and the main battery-side converter 35 are ensured to perform power conversion on the basis of (i.e. in synchrony with) the switching synchronization signal common to the converters. The microcomputer 31 is ensured to variably set the switching phases of the solar generation converter 33, the accessory-side converter 34 and the main battery-side converter 35, depending on the operating conditions of the vehicle power system 20, i.e. the operating conditions (operated or not operated, and input/output electric powers) of these converters.

Figure 3A:
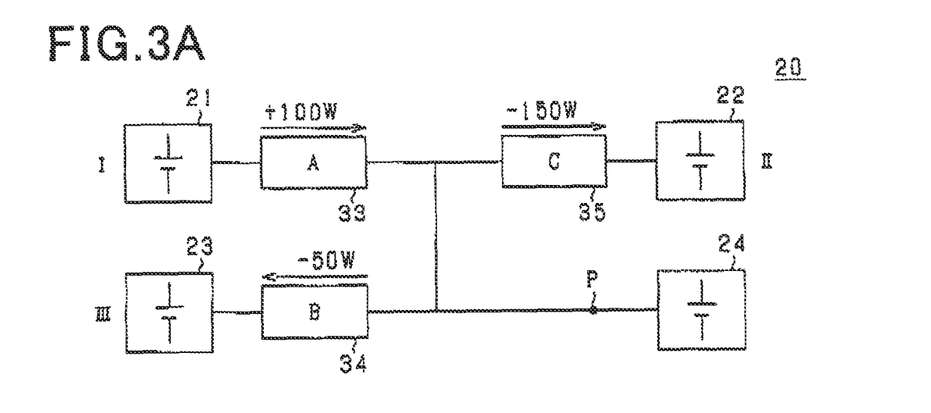
FIGS. 3A, 3B and 3C are schematic diagrams illustrating a specific example of an operation of the vehicle power system illustrated in FIG. 2.

As will be understood from the foregoing description, the vehicle power system 20 includes a plurality of combinations of an electric load and a power converter. FIG. 3A shows a circuit configuration that is a simplification of the circuit configuration shown in FIG. 2. As shown in FIG. 3A, the vehicle power system 20 of the present embodiment includes a combination (I) of the solar panel 21 and the solar generation converter 33, a combination (II) of the main battery 22 and the main battery-side converter 35, and a combination (III) of the accessory battery 23 and the accessory-side converter 34. These three combinations, being parallel to each other, are connected to a predetermined intermediate point P such that the intermediate point P will be positioned near the individual converters.

Specifically, the solar generation converter 33 is ensured to be interposed between the intermediate point P and the solar panel 21. Similarly, the main battery-side converter 35 is ensured to be interposed between the intermediate point P and the main battery 22. Further, the accessory-side converter 34 is ensured to be interposed between the intermediate point P and the accessory battery 23. Thus, in the present embodiment, the solar generation converter 33, the accessory-side converter 34 and the main battery-side converter 35 are connected to the intermediate point P, being parallel to each other. The sub battery 24 is directly connected to the intermediate point P.

As mentioned above, the solar generation converter 33 of the present embodiment operates in a direction of supplying electric power to the intermediate point P to serve as a unidirectional and variable power converter. The accessory-side converter 34 receives an electric power supply from the intermediate point P and operates in a direction of supplying electric power to the accessory battery 23 to serve as a unidirectional and variable power converter. On the other hand, the main battery-side converter 35 receives an electric power supply from the intermediate point P and operates in a direction of supplying electric power to the main battery 22 to serve as a unidirectional and constant power converter.

<Operation>

Figure 3B:
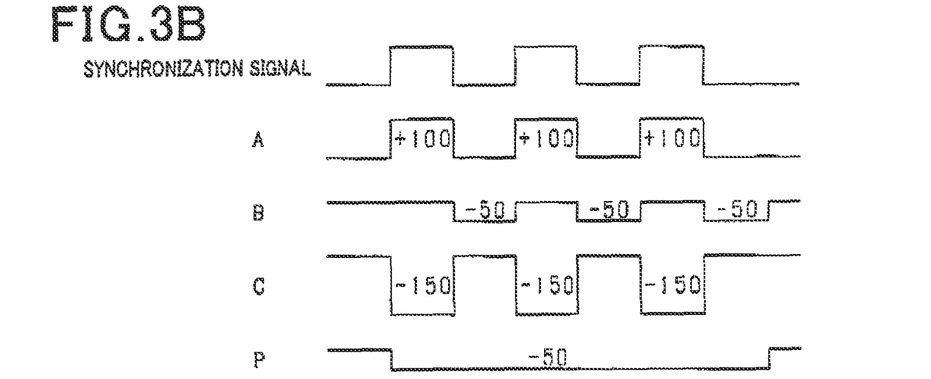
Figure 3C:
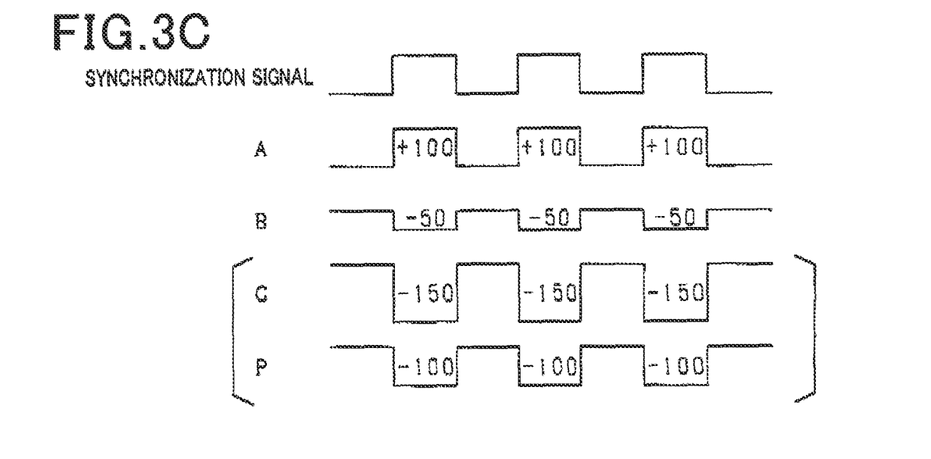

Referring to FIGS. 3A, 3B and 3C as well as the subsequent figures, hereinafter are described an outline of the operation in the configuration of the present embodiment and advantageous effects exerted by the configuration of the present embodiment.

FIG. 3A shows an example of converted power (processed power) in the solar generation converter 33, the accessory-side converter 34 and the main battery-side converter 35 with indication of the direction of transmitting the electric power (see the arrows and the numerical values above the arrows in the figure). Specifically, in the example, the converted power in the solar generation converter 33 is "+100 W". The converted power in the accessory-side converter 34 is "−50 W". The converted power in the main battery-side converter 35 is "−150 W". The converted power in each converter directed to the intermediate point P (i.e. in a direction of charging the sub battery 24) has a value with a "+" sign, and the converted power directed to the opposite direction (i.e. in a direction of discharging the sub battery 24) has a value with a "−" sign (the same applies to FIGS. 4A, 4B and 4C and the subsequent figures).

In the present embodiment, the switching phase of each converter is set according to the following rules.

Converters in a pair having the same power input/output direction with respect to the intermediate point P are set to be mutually in antiphase, Some converters are set to be in equiphase so that power fluctuation at the intermediate point P is suppressed.

Specifically, since there are three converters in the present embodiment, the foregoing rules can be rewritten as follows:

(1) When the solar generation converter 33, the accessory-side converter 34 and the main battery-side converter 35 are all in operation (i.e. when the converted power in these converters is not zero):

The switching phases of a pair of converters having the same power input/output direction (i.e. of the same sign) with respect to the intermediate point P among the solar generation converter 33, the accessory-side converter 34 and the main battery-side converter 35 are set to be mutually in antiphase.

The switching phases of a converter different from the pair and the converter in the pair having a larger absolute value in the input/output power are set to be in equiphase.

(2) When one of the solar generation converter 33, the accessory-side converter 34 and the main battery-side converter 35 is not in operation, the two converters in operation are set to be mutually in antiphase if their power input/output direction with respect to the intermediate point P is the same, or set to be in equiphase if the direction is different.

The term "antiphase" here refers to the turn-on timing being offset by a half period (180°) between the converters involved. Specifically, in FIGS. 3A, 3B and 3C, converters "B" and "C" have the same sign but their turn-on timing is offset from each other by a half period. Accordingly, it is apparent that they are mutually in "antiphase". Further, the turn-on timing is offset by a half period between converters "A" and "B" and thus they are mutually in "antiphase". In addition, since the turn-on timing is also offset by a half period between converters "A" and "C", they are in mutually "antiphase".

Whether to be in "equiphase" or in mutually "antiphase" is determined from a viewpoint of the switching phases, i.e. the on/off control timing, that is, a viewpoint that which of the halves of a period should have the turn-on timing. From this point of view, the "equiphase" can be termed as a "0-period shift", while the "antiphase" can be termed as a "half-period shift".

In the timing diagrams shown in FIGS. 3B and 3C, the "synchronization signal" indicates the predetermined switching synchronization signal mentioned above (this signal is inputted from the microcomputer 31 shown in FIG. 2 to the individual converters). In these figures, references "A", "B" and "C" indicate the states of power conversions in the solar generation converter 33, the accessory-side converter 34 and the main battery-side converter 35, respectively. Accordingly, hereinafter, these converters are simply referred to as "converter A", "converter B" and "converter C". Further, reference "P" in the diagrams indicates the state of power fluctuation (power balance) at the intermediate point P. The same applies to FIGS. 4A, 4B and 4C and the subsequent figures.

According to the foregoing rules, the specific example shown in FIG. 3A can draw a result as shown in FIG. 3B. Specifically, as shown in FIG. 3B, since the converters B and C have the same sign, they are mutually in antiphase. Further, the converter A having a different sign is in equiphase with whichever of the converters and C having a larger absolute value in the converted power. Accordingly, the intermediate point P will constantly have a power of "−50 W" and thus the fluctuation in the power balance (i.e. charge/discharge state of the sub battery 24) is suppressed as soon as possible. Thus, ripple current and the noise accompanying the ripple current will be more effectively suppressed.

FIG. 3C shows a state where the converters A, B and C are all driven in equiphase. As shown in FIG. 3C, the power fluctuation at the intermediate point P is large and thus ripple current and the noise accompanying the ripple current become large.

As shown in FIG. 3C as well, when the converter C (shown in brackets) is not in operation, the converters A and B are driven in equiphase.

Figure 4A:
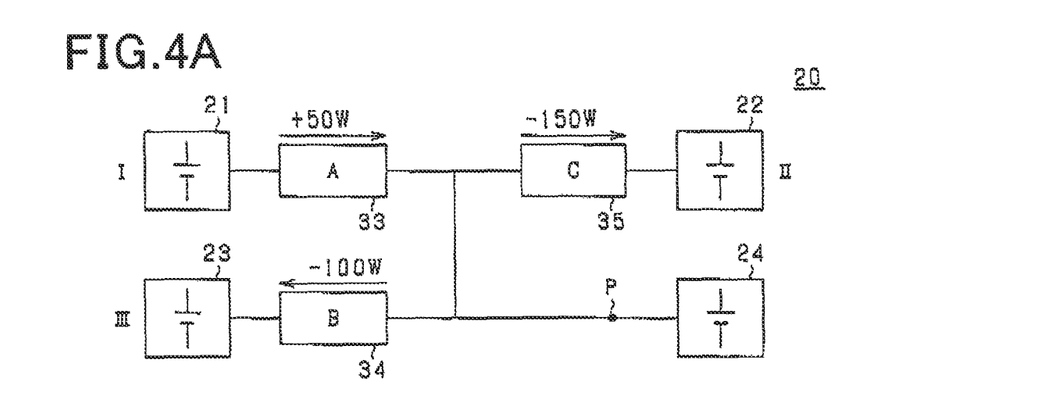
FIGS. 4A, 4B and 4C are schematic diagrams illustrating a specific example of an operation of the vehicle power system illustrated in FIG. 2.
Figure 4B:
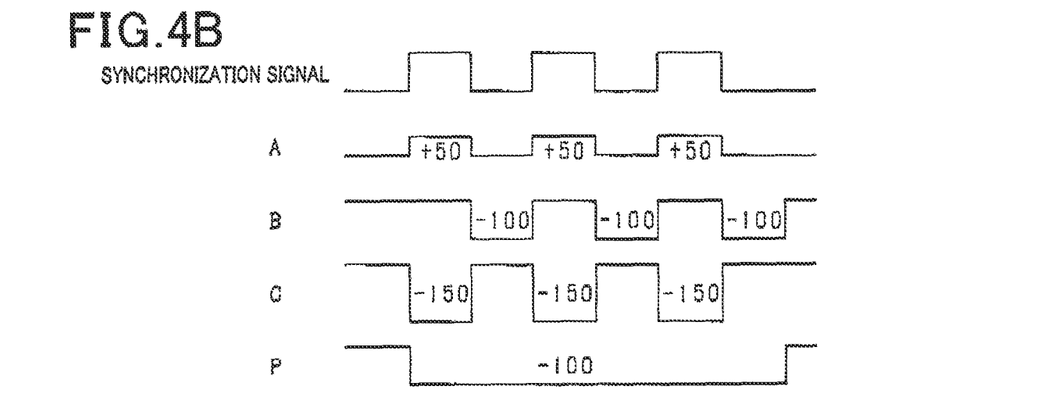
Figure 4C:
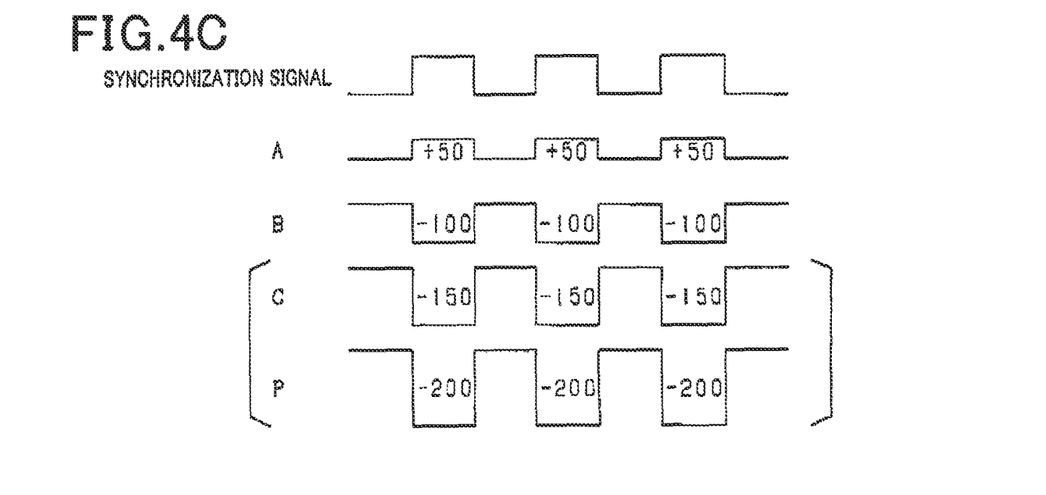

In the example shown in FIGS. 4A, 4B and 4C, the converted power in the solar generation converter 33 is "+50 W". The converted power in the accessory-side converter 34 is "−100 W". The converted power in the main battery-side converter 35 is "−150 W". In this example as well, the converters B and C are mutually in antiphase as they have the same sign. The converter A having a different sign is in equiphase with the converter C having a larger absolute value in the converted power than the converter B. Accordingly, the intermediate point P will constantly have a power of "−100 W" and thus the fluctuation in the power balance (i.e. charge/discharge state of the sub battery 24) is suppressed as soon as possible.

FIG. 4C shows a state where the converters A, B and C are all driven in equiphase. As shown in FIG. 4C, the power fluctuation at the intermediate point P is large and thus ripple current and the noise accompanying the ripple current become large.

As shown in FIG. 4C as well, when the converter C (shown in brackets) is not in operation, the converters A and B are driven in equiphase.

Figure 5A:
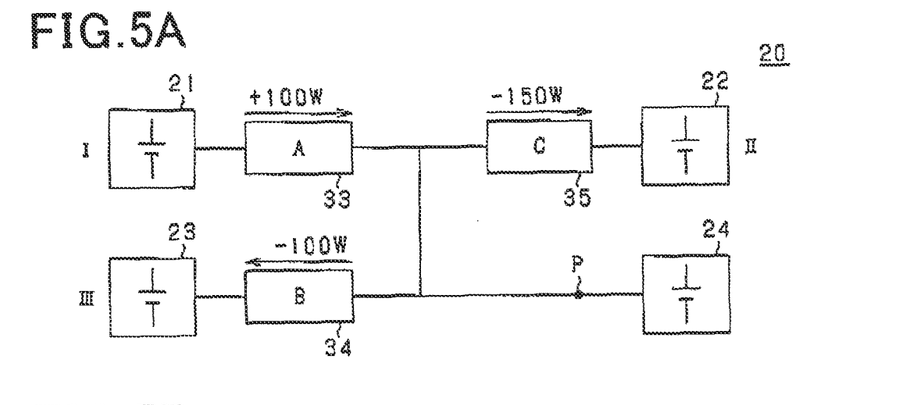
FIGS. 5A, 5B and 5C are schematic diagrams illustrating a specific example of an operation of the vehicle power system illustrated in FIG. 2.
Figure 5B:
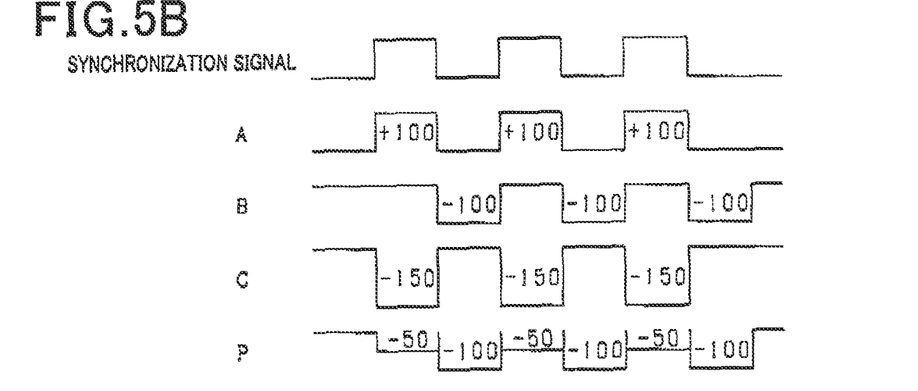
Figure 5C:
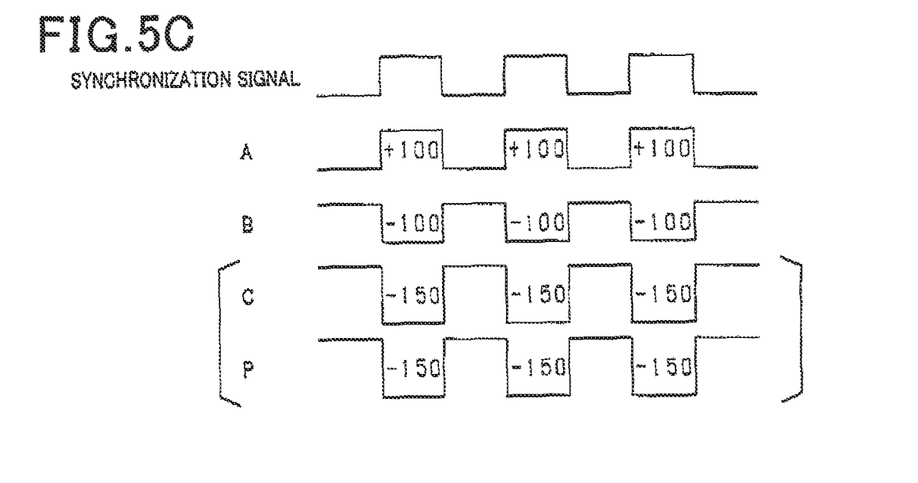

In the example shown in FIGS. 5A, 5B and 5C, the converted power in the solar generation converter 33 is "+100 W". The converted power in the accessory-side converter 34 is "400 W". The converted power in the main battery-side converter 35 is "−150 W". In this example as well, the converters B and C are mutually in antiphase as they have the same sign. The converter A having a different sign is in equiphase with the converter C having a larger absolute value in the converted power than the converter B. Accordingly, the fluctuation in the power balance at the intermediate point P (i.e. charge/discharge state of the sub battery 24) is suppressed as soon as possible.

FIG. 5C shows a state where the converters A, B and C are all driven in equiphase. As shown in FIG. 5C, the power fluctuation at the intermediate point P is large and thus ripple current and the noise accompanying the ripple current become large.

As shown in FIG. 5C as well, when the converter C (shown in brackets) is not in operation, the converters A and B are driven in equiphase.

As described above, in the present embodiment, ripple current and the noise accompanying the ripple current are more effectively suppressed, irrespective of the change in the operating conditions (converted powers) of the converters A, B, . . . .

<Modifications>

Hereinafter, some of modifications are exemplified. In the following modifications, the components having configurations and functions identical with or similar to those in the foregoing embodiment are given the same reference numerals. Within a scope not technically contradictory to the present invention, the explanations in the foregoing embodiment shall be appropriately applied to the explanations of these components. As a matter of course, modifications shall not be limited to those provided below. Further, within a scope not contradictory to the present invention, a part of the foregoing embodiment, and all or a part of a plurality of modifications can be appropriately combined.

The present invention is not limited to the specific apparatus configuration described above. For example, the present invention may preferably be applied to electric cars or hybrid cars. As a matter of course, the present invention is not limited to an in-vehicle system. Further, the output voltages of the individual batteries and converters may be appropriately changed from those in the foregoing specific examples. Also, a part of the drive controllers 25b, 33b, 34b and 35b may use a power source other than the accessory battery 23. In addition, power source may be supplied to the accessories 13 only from the accessory battery 23.

Figure 6A:
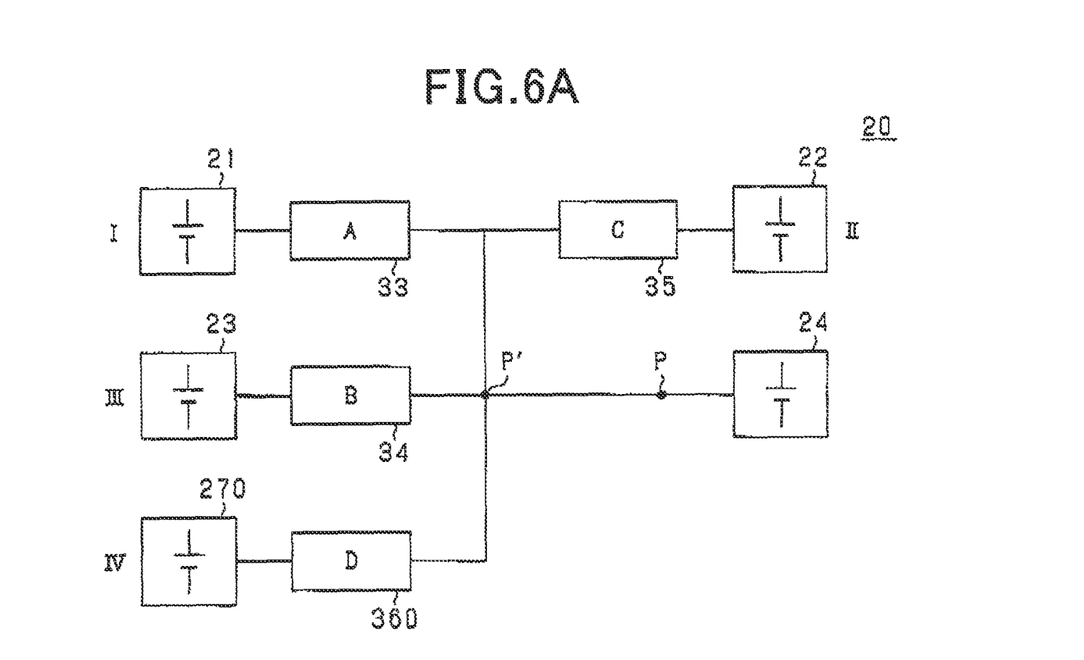
FIGS. 6A and 6B are schematic diagrams illustrating a configuration and an operation of a modification of the vehicle power system illustrated in FIGS. 3A, 3B and 3C.

The combination of an electric load and a converter may be provided by four or more, FIG. 6A shows the vehicle power system 20. As shown, the vehicle power system 20 includes a combination (IV) of an electric load 270 and a converter 36 (hereinafter referred to as "converter D") in addition to the configuration shown in FIGS. 3A, 3B and 3C.

When two or three of the converters A, B, C and D in this configuration are in operation, the rules of the foregoing example may be applied. On the other hand, when all of the converters A, B, C and D are in operation, the rules will be as follows:

The converters having the same sign with respect to the intermediate point P (or an intermediate point P') are mutually in antiphase.

Whichever of the converters has positive (+) sign and having a largest absolute value is in equiphase with whichever of the converters has negative (−) sign and having a largest absolute value.

Figure 6B:
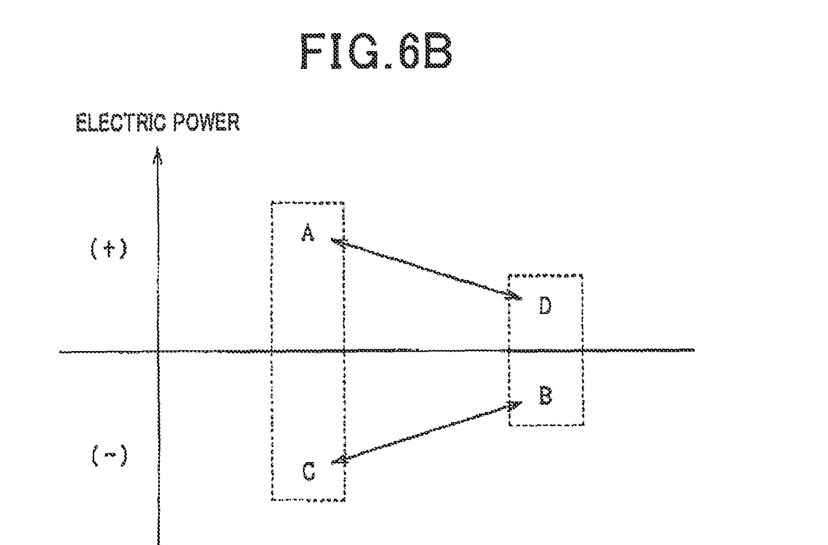

In the example, as shown in FIG. 6B, the converters A and D having positive (+) sign are mutually in antiphase, while the converters C and B having negative (−) sign are mutually in antiphase (see the arrows in the figure). Further, the converters A and C having a larger absolute value are in equiphase. Similarly, the converters B and D having a smaller absolute value are in equiphase (see the dash lines in the figure).

As described above, the switching phases in the plurality of converters A, B, . . . may all be individually controlled. Alternatively, some specific converters may constantly be set to be in equiphase or mutually in antiphase.

The electric loads are not limited to batteries or solar panels but may be any electric loads provided that the electric loads can input/output electric power. Specifically, for example, electric motors, commercial power sources or the like may correspond to the electric loads.

The power converters may be bidirectional converters. Further, it is preferable that at least one of the plurality of "power converters" has variable converted power.

As a matter of course, those modifications which are not particularly referred to shall be encompassed in the technical scope of the present: invention as far as the essential parts of the present invention are not changed in the modifications. The operationally/functionally expressed components among the components that configure the embodiments shall encompass not only the specific configurations and their equivalents disclosed in the foregoing embodiment and modifications, but also whatever configuration that may realize the operations/functions.

Hereinafter, aspects of the above-described embodiments will be summarized.

An electric power system of the present disclosure includes a plurality of combinations of an electric load and a power converter. The plurality of combinations are connected to a predetermined intermediate point so as to be parallel to each other. The electric loads are ensured to input/output electric power. The power converters are connected to the respective electric loads. The power converters perform power conversion according to a predetermined switching synchronization signal so that electric power is transmitted/received to/from the respective electric loads. In other words, the plurality of power converters provided in the electric power system are ensured to operate on the basis of the common switching synchronization signal.

The electric power system of the present disclosure includes a power conversion control unit. The power conversion control unit is ensured to control the operations of the plurality of power converters. The present disclosure has characteristics in which the power conversion control unit variably sets the switching phases of the plurality of power converters depending on the operating conditions of the power converters.

In the electric power system having such a configuration, the power conversion control unit controls the operations of the plurality of power converters. In this case, the power conversion control unit variably sets the switching phases of the plurality of power converters depending on the operating conditions of the power converters. Accordingly, each of the plurality of power converters can be operated with an appropriate switching phase (i.e. switching phase that suppresses ripple current and the noise accompanying the ripple current as soon as possible) depending on the operating conditions of the converter. Thus, according to the present disclosure, ripple current and the noise accompanying the ripple current are more effectively suppressed.

What is claimed is:
1. An electric power system, comprising:
a plurality of combinations of one of electric loads, which transmit/receive electric power, and one of power converters which is connected to the one of the electric loads and performs power conversion operation according to a predetermined switching synchronization signal so that electric power is transmitted/received to/from the electric load, the combinations being connected to a predetermined intermediate point so as to be parallel to each other and the power converters including:
a first power converter which is connected to a first load included in the electric loads;
a second power converter which is connected to a second load included in the electric loads; and
a third power converter which is connected to a third load included in the electric loads; and
a power conversion control unit which controls operations of the power converters, wherein
the power conversion control unit variably sets switching phases of the power converters depending on operating conditions of the power converters;
the power conversion control unit sets the switching phase of each of the power converters so that the power conversion control unit sets the switching phase of a pair of two of the first power converter, the second power converter, and the third power converter so as to be mutually in antiphase, the pair having the same power input/output direction with respect to the intermediate point; and
the power conversion control unit sets the switching phase of the power converter different from the pair and whichever of the converts in the pair having a larger absolute value in the input/output power so as to be in equiphase so that power fluctuation at the intermediate point is suppressed.

2. The electric power system according to claim 1, wherein
the electric loads include a fourth load connected to the intermediate point.

3. The electric power system according to claim 2, wherein
the electric power system is installed in an electric vehicle driven by a drive motor,
the second load is a main battery which supplies source power required for driving the drive motor,
the third load is an accessory battery which supplies source power required for activating an accessory of the electric vehicle, and
the fourth load is a sub battery which is charged with electric power obtained by converting electric power outputted from the first load by the first power converter, and which outputs electric power to be charged to the main battery or the accessory battery.

4. The electric power system according to claim 1, wherein
the electric loads include a solar power generation apparatus.

5. The electric power system according to claim 1, wherein
at least one of the power converters variably converts electric power.

6. An electric power system, comprising:
a first power converter which is connected to a first load, which is one of electric loads transmitting/receiving electric power, and performs power conversion operation based on a predetermined switching synchronization signal so that electric power is transmitted/received to/from the first load;
a second power converter which is connected to a second load, which is included in the electric loads, and performs power conversion operation based on the switching synchronization signal so that electric power is transmitted/received to/from the second load;
a third power converter which is connected to a third load, which is included in the electric loads, and performs power conversion operation based on the switching synchronization signal so that electric power is transmitted/received to/from the third load; and
a power conversion control unit which controls operations of the first power converter, the second power converter, and the third power converter, wherein
the first power converter, the second power converter, and the third power converter are connected to a predetermined intermediate point so as to be parallel to each other,
the power conversion control unit variably sets switching phases of the first power converter, the second power converter, and the third power converter depending on operating conditions of the first power converter, the second power converter, and the third power converter;
the power conversion control unit sets the switching phase of a pair of two of the first power converter, the second power converter, and the third power converter so as to be mutually in antiphase, the pair having the same power input/output direction with respect to the intermediate point; and
the power conversion control unit sets the switching phase of the power converter different from the pair and whichever of the power converts in the pair having a larger absolute value in the input/output power so as to be in equiphase.

* * * * *